US012467602B1

(12) United States Patent
Jiang et al.

(10) Patent No.: US 12,467,602 B1
(45) Date of Patent: Nov. 11, 2025

(54) LIGHT SHADING DEVICE HAVING CURVED GUIDANCE AND STAGE LIGHT FIXTURE

(71) Applicant: Guangzhou Haoyang Electronic Co., Ltd., Guangzhou (CN)

(72) Inventors: Weikai Jiang, Guangzhou (CN); Zhenbiao Ming, Guangzhou (CN); Zhiqiang Chen, Guangzhou (CN)

(73) Assignee: GUANGZHOU HAOYANG ELECTRONIC CO., LTD., Guangzhou (CN)

( * ) Notice: Subject to any disclaimer, the term of this patent is extended or adjusted under 35 U.S.C. 154(b) by 0 days.

(21) Appl. No.: 18/964,032

(22) Filed: Nov. 29, 2024

(30) Foreign Application Priority Data

Nov. 20, 2024 (CN) ......................... 202411672057.6

(51) Int. Cl.
*F21V 11/18* (2006.01)
*F21S 6/00* (2006.01)
*F21V 14/08* (2006.01)
*F21W 131/406* (2006.01)

(52) U.S. Cl.
CPC ............. *F21V 11/186* (2013.01); *F21S 6/006* (2013.01); *F21V 14/08* (2013.01); *F21W 2131/406* (2013.01)

(58) Field of Classification Search
CPC ...... F21V 11/18; F21V 11/183; F21V 11/186; F21V 14/08; F21V 14/085
See application file for complete search history.

(56) References Cited

U.S. PATENT DOCUMENTS

| | | | | |
|---|---|---|---|---|
| 8,911,120 B2 | 12/2014 | Dalsgaard et al. | | |
| 2011/0222290 A1* | 9/2011 | Cavenati | F21V 11/18 362/277 | |
| 2015/0109797 A1* | 4/2015 | Jurik | F21V 11/18 362/321 | |
| 2022/0049839 A1* | 2/2022 | Jiang | F21V 17/02 | |
| 2023/0152599 A1 | 5/2023 | Dalsgaard | | |

FOREIGN PATENT DOCUMENTS

| | | | | |
|---|---|---|---|---|
| CN | 118881997 A * | 11/2024 | | |
| WO | WO-9636834 A1 * | 11/1996 | F21V 11/18 | |
| WO | WO-2007134609 A1 * | 11/2007 | F21S 10/007 | |
| WO | WO-2015057235 A1 * | 4/2015 | F21V 11/186 | |

* cited by examiner

*Primary Examiner* — Alexander K Garlen
(74) *Attorney, Agent, or Firm* — Muncy, Geissler, Olds & Lowe, P.C.

(57) ABSTRACT

A light shading device having curved guidance includes a light passing hole for light beams passing therethrough and at least one pair of shading blades arranged opposite one another. Each pair of shading blades respectively have a shading edge for shading light beams at a side close to each other, while the two ends of the side away from each other are respectively connected with a double-link arm which includes a first connecting rod and a second connecting rod pivoting each other, the other end of the first connecting rod is connected to the corresponding shading blade, and the other end of the second connecting rod is connected to a driving element. A guide element is further provided for limiting a guide point on each shading blade to move along a curved path on the plane where the corresponding shading blade is located.

20 Claims, 6 Drawing Sheets

LIGHT SHADING DEVICE HAVING CURVED GUIDANCE AND STAGE LIGHT FIXTURE

CROSS REFERENCE TO RELATED APPLICATIONS

The present application claims priority from Chinese Application No. CN 202411672057.6 filed on Nov. 20, 2024, all of which are hereby incorporated herein by reference.

TECHNICAL FIELD

The present invention relates to the technical field of light shading, and more particularly, relates to a light shading device having curved guidance and a stage light fixture including the same.

BACKGROUND

As common performance equipment, stage light fixtures are required to have higher luminance, the power thereof thus is increasingly becoming larger in turn. A light shading device is usually provided in the stage light fixture to shape the projected light beams by shading the light beams with a shading blade, resulting in different shapes of the projected light beams. Due to larger power of the light beams as mentioned previously, the shading blade would absorb more heat during shading the light beams. As a result, the shading blade is prone to thermal deformation, which would bring influence on image effects of light spots projected.

SUMMARY

It is therefore an object of the present invention to provide a light shading device having curved guidance and a stage light fixture including the same, which can intercept or block the light beams by promptly changing zones of a shading blade of the light shading device, thereby preventing the shading blade from locally absorbing excess heat.

One aspect of the present invention provides a light shading device having curved guidance, including a light passing hole for light beams passing therethrough. At least one pair of shading blades arranged opposite one another are provided for intercepting at least a portion of the light beams to shape the light beams, especially passing through the light passing hole. Each pair of shading blades respectively have a shading edge for shading light beams at a side close to each other, while the two ends of the side away from each other are respectively connected with a double-link arm which includes a first connecting rod and a second connecting rod pivoting each other, the other end of the first connecting rod is connected to the corresponding shading blade, and the other end of the second connecting rod is connected to a driving element and is rotatable by means of the driving element. The driving element is fastened on a rotatable base plate, such rotatable base plate is configured to drive all the shading blades to rotate integrally. A guide element is further provided for limiting a guide point on each shading blade to move along a curved path on the plane where the corresponding shading blade is located.

According to the present invention, the light shading device having curved guidance is provided with a guide element which guides the guide point on each shading blade to move along a curved path, so that the corresponding shading blade will be shifted in the direction perpendicular to the arrangement direction of respective pair of shading blades under the guidance of the guide point, during the pair of shading blades moving towards each other or moving away from each other. With such configuration, the zone of each shading blade intercepting or blocking the light beams can be promptly changed, thereby avoiding thermal deformation of the corresponding shading blade due to long-term heat accumulation in certain zone and thus avoiding impact on image effects of light spots projected or even directly damage to the image effects of light spots projected.

The curved path is preferably in form of a circular arc. Such curved path can be defined by the guide element in an easy way.

In order to reduce mutual inference with other motional elements during moving of the shading blades, the center of the curved path and the center of the light passing hole are respectively arranged two sides of the curved path according to an advantageous embodiment of the present invention.

The guide element is preferably in form of a guide rod with one end thereof connected to the guide point and the other end thereof fixedly pivoted. That is, the end of the guide rod pivoted to the guide point is moved around the other end as the length thereof as radius, and the moving path is the curved path. This can effectively reduce lag by guiding the guide point through the guide rod.

In order to avoid contact with a pivoting post at the pivoted end of the guide rod corresponding to the adjacent shading blade during rotation of the second connecting rod, the length of the second connecting rod is less than the distant between the driving shaft of the driving element and the center of the curved path, according to a preferable embodiment of the present invention.

According to a preferable embodiment of the present invention, the guide point is the connecting point of the shading bade with the first connecting rod of the corresponding shading blade. Directly taking the connecting point of the shading bade with the corresponding first connecting rod as the guide point makes use of the existing structure, also avoids mutual interference between the guide point and the other elements, or the other elements is not required to provide avoidance for the moving space of the guide point.

According to the present invention, the chord length of the curved path in the arrangement direction of the corresponding pair of shading blades is preferably more than the diameter of the light passing hole. In such way, the curved path allows the shading blades to move to a first position where the light passing hole is completely shaded, under cooperation of the double-link arm, from a second position where the light passing hole is completely unshaded, or vice versa, thereby achieving various light shading effects.

Furthermore, the radius of the curved path is more than half of the largest distance between the proximal and distal ends of the double-link arm. This can ensure that the chord height of the curved path with same chord length is not too long, which avoids the moving of the guide point occupying too much space.

In addition, the chord height of the curved path in the direction perpendicular to the arrangement direction of the corresponding pair of shading blades is preferably less than 1 centimeter. This allows the shading blades to shift in the direction perpendicular to the arrangement direction of the pair of the shading blades, so as to promptly change the zones of the shading blades intercepting the light beams. Meanwhile, this also avoids interference with other elements due to large moving range of the shading blades.

Furthermore, the length of the second connecting rod is preferably more than half of the diameter of the light passing hole and less than the diameter of the light passing hole. With such configuration, the shading blades can move to the first position where the light passing hole is completely shaded, under cooperation of the other double-link arm, from the second position where the light passing hole is completely unshaded, during the pivoted point of the first connecting rod relative to the second connecting rod rotating to the position closest to the light passing hole from the position farthest away from the light passing hole, thereby achieving various light shading effects, while occupying less space due to the second connecting rod being not too long.

More preferably, when the guide point lies in the middle of the curved path during moving along the curved path, the corresponding shading blade is deviated farthest away from the light passing hole in the direction perpendicular to the arrangement direction of the pair of shading blades. This can achieve that the shading blades reciprocally move in the direction perpendicular to the arrangement direction of the pair of shading blades, during the guide point moving from one end of the curved path to the other end thereof, which continuously changes the zones of the shading blades intercepting the light beams, while without occupying too much moving space.

According to the present invention, the first connecting rod may have a curved avoidance portion to avoid the driving shaft of the driving element. The curved design of the first connecting rod increase moving range thereof, thus in turn increasing moving range of the corresponding shading blade.

Furthermore, the distance between the connecting points of the corresponding first connecting rod respectively pivoted to two ends of the side away from each other of each pair of shading blades is more than or equal to $\sqrt{2}$ times the diameter of the light passing hole and less than or equal to 2 time the diameter of the light passing hole. This allows the corresponding shading blade to shade the light passing hole in a direction with an angle from 30 degrees to 45 degrees relative to the arrangement direction of the corresponding pair of the shading blades.

The light shading device may further include a separator plate to limit motion of the shading blades in the direction perpendicular to the plane where the shading blades arranged. The separator plate is provided with a hollow portion for the light beams passing therethrough. The lateral side of the corresponding shading blade adjacent to the shading edge thereof is always located outside the hollow portion. With such configuration, it is not prone to jamming between the shading blades and the hollow portion and the lateral side of the shading blades adjacent to the shading edge thereof will not enter the hollow portion to finally be imaged and thus avoiding influence on light effects.

The second connecting rod can be rotated forwardly and inversely so that the shading blades can be smoothly and promptly switched in/out within the limited angle. While reduction of the number of the limiting post can simplify design and lower manufacture costs. Therefore, the maximum forward and inverse rotational angle of the second connecting rod may be designed to be merely restricted by one limiting post.

The guide element may also be in form of a guide plate with a curved guide slot, along which the guide point is movable. This can simplify structure of the guide element and the curved path can be more varied.

Two pairs of shading blades having perpendicular arrangement direction may be provided. The light beams through the light shading device thus can be shaded by four shading blades, thereby obtaining light spots in different shapes generated by the light beams.

To ensure adequate space to freely mount the other elements, the guide points for two adjacent shading blades are arranged at the side of the shading blades close to each other or away from each other.

In the present invention, the driving shaft of the driving element may be provided with a detachable shaft sleeve, to which the second connecting rod is pivoted, so that the height of the double-link arm and thus the shading blades can be adjusted by replacing the shaft sleeve in different heights, facilitating standardization of the elements.

Another aspect of the present invention provides a stage light fixture with a light head, a light source and the light shading device having curved guidance in any case mentioned above are provided inside the light head. The light beams generated by the light source pass through the light passing hole of the light shading device and are finally projected from the light outlet. The light shading device inside the light head shapes the light beams generated by the light source in different shape by intercepting or blocking at least portion of the light beams, thereby projecting light spots with abundant light effect.

In addition, the light head may be further provided with an effect generating assembly for generating light effects to rich light effects of the light spots projected, a focusing assembly for adjusting the focus of the light beams and thus regulate the clarity of the light spots projected, and/or a magnifying assembly for adjusting the divergence angle of the light beams and thus regulate the size of the light spots projected.

In order to project the light beams from the light head at any angle, the stage light fixture in the present invention may further include a support arm for supporting the light head to rotate and a base for supporting the support arm to rotate.

Additional advantages, features and possible applications of the present invention will be apparent from the description which follows, in which reference is made to the embodiments illustrated in the drawings.

DETAILED DESCRIPTION

Figure 1:
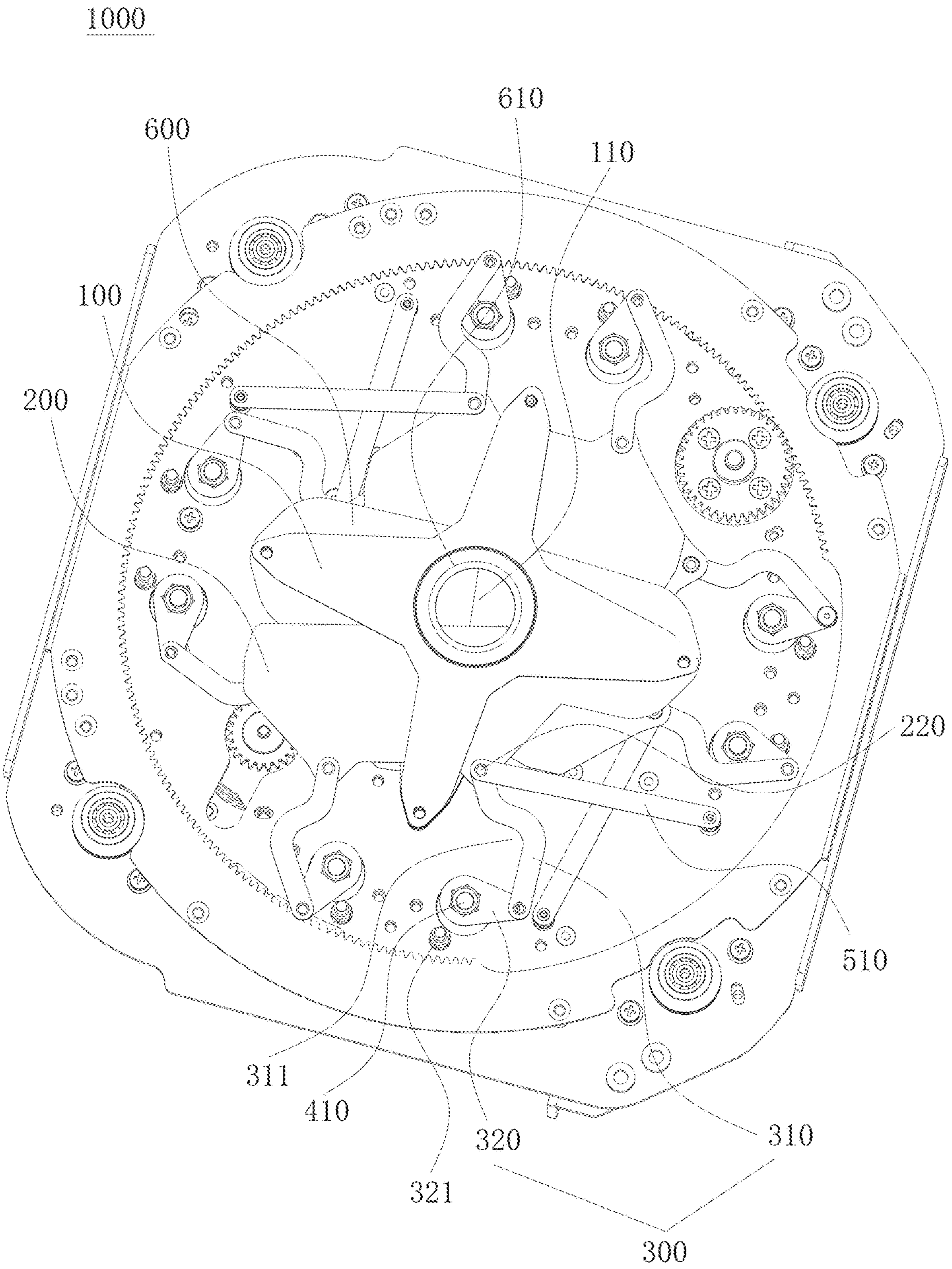
FIG. 1 is a perspective view of a light shading device according to an embodiment of the present invention.

The accompanying drawings are for exemplary illustration only, and should not be construed as limitations on this invention. In order to better illustrate the present embodiment, some parts of the accompanying drawings may be omitted, enlarged or reduced, and do not represent the size of actual products. For those skilled in the art, it is understandable that certain well-known structures and descriptions thereof may be omitted in the drawings. The positional relationship described in the drawings is only for exemplary illustration, and should not be construed as a limitation on this invention.

FIG. 1 shows a light shading device 1000 having curved guidance according to an embodiment, with a light passing hole 110 for light beams passing therethrough. At least one pair of shading blades 200 arranged opposite one another are provided for intercepting at least a portion of the light beams to shape the light beams especially passing through the light passing hole 110. Each pair of shading blades 200 respectively have a shading edge 210 for shading light beams at a side close to each other, while the two ends of the side away from each other are respectively connected with a double-link arm 300 which includes a first connecting rod 310 and a second connecting rod 320 pivoting each other, the other end of the first connecting rod 310 is connected to the corresponding shading blade 200, and the other end of the second connecting rod 320 is connected to a driving element 400 and is rotatable by means of the driving element 400. The driving element 400 is fastened on a rotatable base plate 700, such rotatable base plate 700 is configured to drive all the shading blades 200 to rotate integrally. A guide element is further provided for limiting a guide point 220 on each shading blade 200 to move along a curved path C on the plane where the corresponding shading blade 200 located. Particularly, the light passing hole 110 is arranged on a round plate 100 mounted on the base plate 700. The round plate 100 can block edge portion of the light beams or stray light to increase uniformity of the light spots projected.

The light shading device 1000 having curved guidance according to the present embodiment is provided with a guide element which guides the guide point 220 on each shading blade 200 to move along a curved path C, so that the corresponding shading blade 200 will be shifted in the direction (as indicated by dotted arrow B) perpendicular to the arrangement direction (as indicated by dotted arrow A) of respective pair of shading blades 200 under the guidance of the guide point 220, during the pair of shading blades 200 moving towards each other or moving away from each other. With such configuration, the zone of each shading blade 200 intercepting or blocking the light beams can be promptly changed, thereby avoiding thermal deformation of the corresponding shading blade 200 due to long-term heat accumulation in certain zone and thus avoiding impact on image effects of light spots projected or even directly damage to the image effects of light spots projected.

It should be noted that the first connecting rod 310 is stationary relative to the corresponding shading blade 200, namely not moving relative to the shading blade 200.

According to the present embodiment, the end of the second connecting rod 320 is rotatable by means of the driving element 400 to swing the end of the first connecting rod 310 connected therewith, thereby driving the end of the first connecting rod 310 connected to the second connecting rod 320 to act a curved movement with the end of the second connecting rod 320 connected to the driving element 400 as a center and the length of the second connecting rod 320 as radius. Under the guidance for the guide point 220 by the guide element, each rotation angle of the two second connecting rods 320 of the same shading blade 200 corresponds to a unique location of the corresponding shading blade 200.

Each pair of the shading blades 200 are preferably arranged in different planes.

In the present embodiment, the shading edge 210 is a straight edge.

In the present embodiment, the two ends of each pair of the shading blades 200 at the side away from each other is respectively protruded with a connecting portion for connecting with the first connecting rod 310.

In a preferable embodiment, the curved path C is in form of a circular arc. Such curved path C can be defined by the guide element in an easy way.

The central angle of the curved path Cis less than 45 degrees, preferably less than 35 degrees, more preferably less than 20 degrees. In the present embodiment, the central angle of the curved path C is less than 15 degrees.

Figure 4:
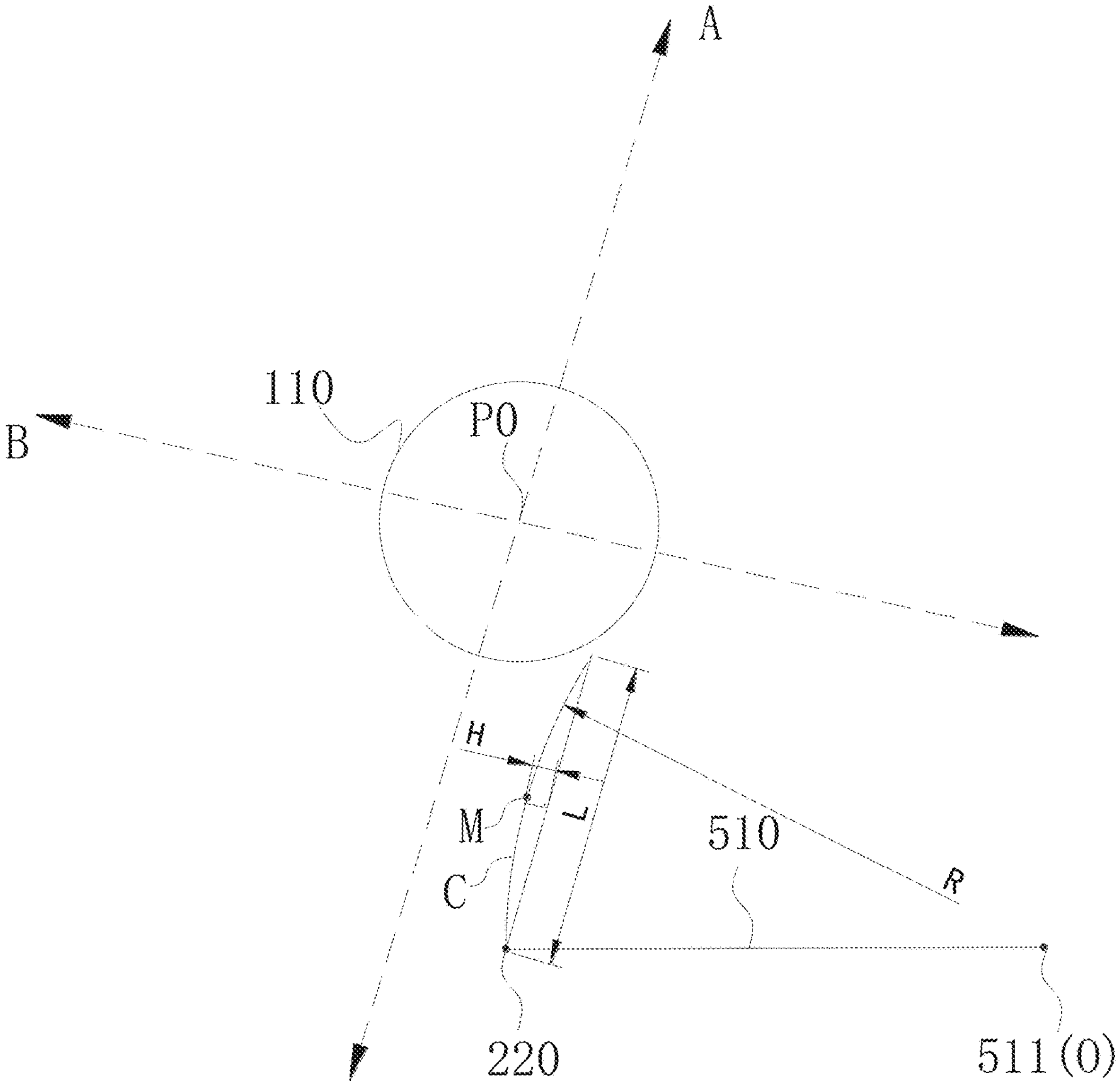
FIG. 4 is a view showing a curved path according to an embodiment of the present invention.

According to a preferable embodiment, in order to reduce mutual inference with other motional elements during moving of the shading blades 200, the center O of the curved path C and the center O of the light passing hole 110 are respectively arranged two sides of the curved path C (show in FIG. 4). That is, the center P0 of the light passing hole 110 is located beyond the area defined by the circle corresponding to the curved path C.

According to a preferable embodiment, the guide element is in form of a guide rod 510 with one end thereof connected to the guide point 220 and the other end thereof fixedly pivoted. It can effectively reduce lag by guiding the guide point 220 through the guide rod 510.

It can be conceived that the guide rod 510 may be in any shapes, preferably in straight shape.

With one end of the guide rod 510 fixedly pivoted, the guide point 220 can further conduct a curved movement with the pivoted point 511 of the guide rod 510 as a center O and the length of the guide rod 510 as radius R, the moving path is the curved path C mentioned above. The length of the guide rod 510 refers to the distance between the pivoted point of the guide rod 510 and the guide point 220.

In a preferable embodiment, the length of the second connecting rod 320 is less than the distant between the driving shaft 410 of the driving element 400 and the center O of the curved path C. The length of the second connecting rod 320 refers to the distant between the pivoted point with the first connecting rod 310 and the driving shaft 410 of the driving element 400. The center O of the curved path C refers to the pivoted point 511 of the guide rod 510. By designing the length of the second connecting rod 320 being less than the distant between the driving shaft 410 of the driving element 400 and the center O of the curved path C, contact with a pivoting post 512 at the pivoted end of the guide rod 510 corresponding to the adjacent shading blade 200 can be avoided during rotation of the second connecting rod 320.

The guide point 220 may be at any position on the shading blade 200. According to a preferable embodiment, the guide point 220 is the connecting point of the shading bade 200 with the first connecting rod 310 of the corresponding shading blade 200. Directly taking the connecting point of the shading bade 200 with the corresponding first connecting rod 310 as the guide point 220 makes use of the existing structure, also avoids mutual interference between the guide point 220 and the other elements, or the other elements is not required to provide avoidance for the moving space of the guide point 220.

Figure 2:
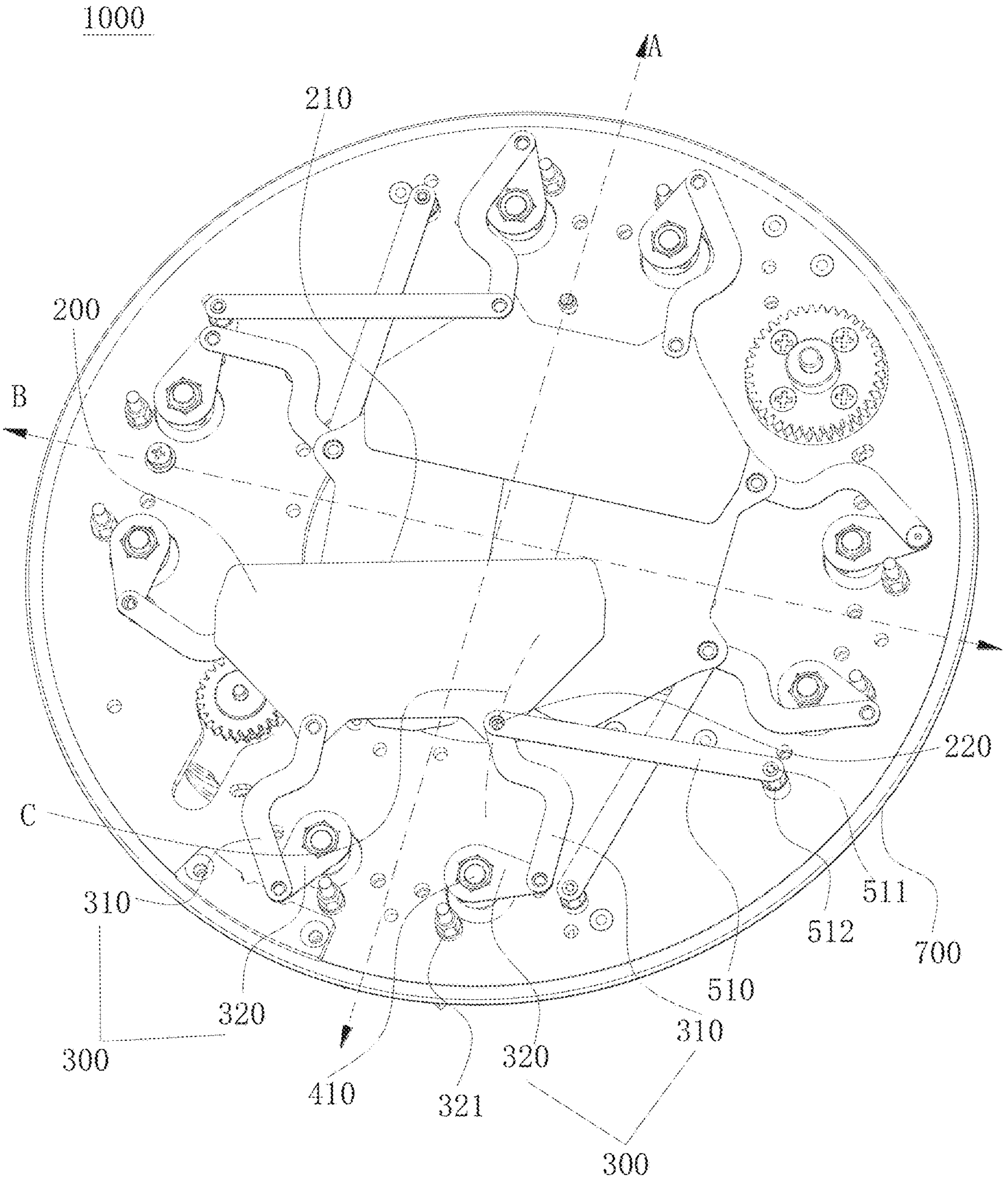
FIG. 2 is a perspective view of a driving structure of shading blades of the light shading device of FIG. 1, in which an arrangement direction and a direction perpendicular to the arrangement direction of a pair of shading blades at the top are show with dotted arrow.
Figure 3:
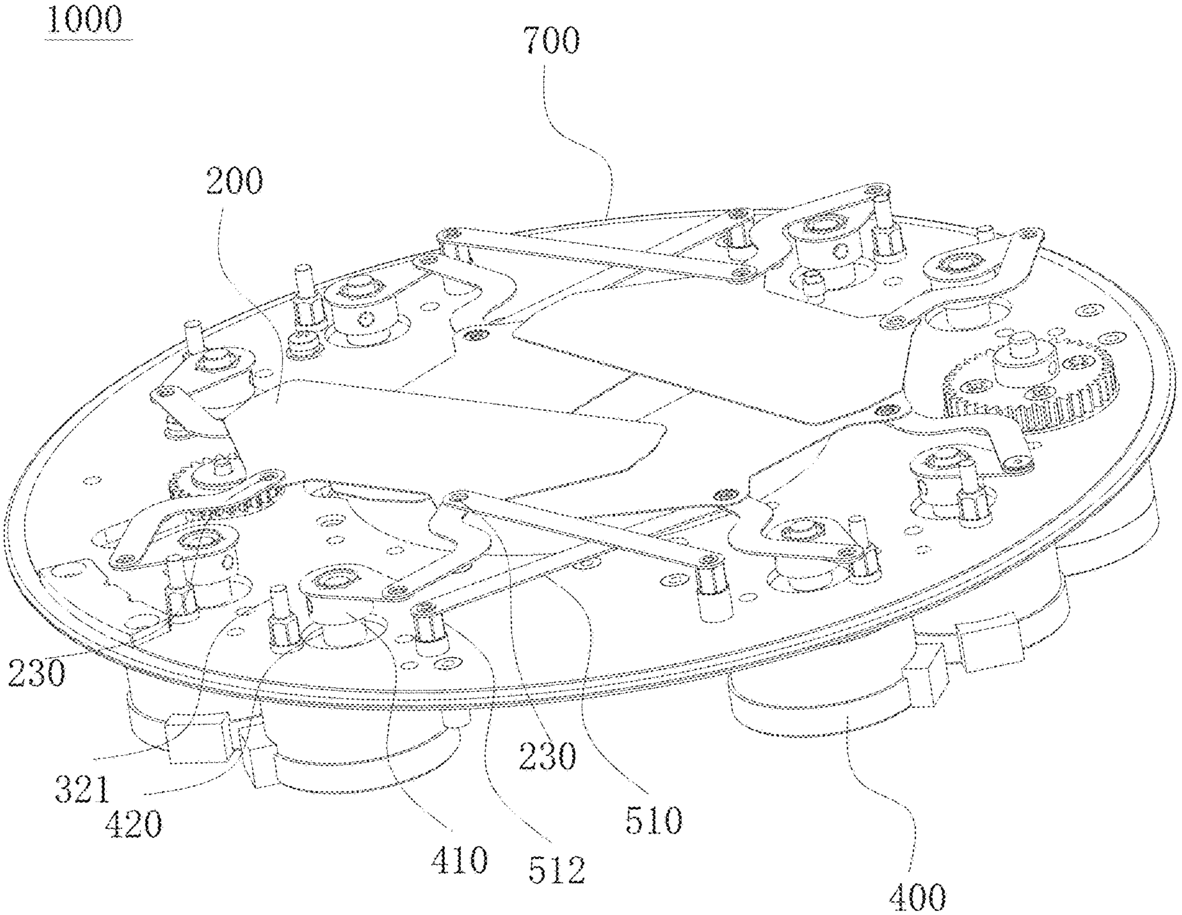
FIG. 3 is another perspective view of a driving structure of shading blades of the light shading device of FIG. 2.

FIG. 2 and FIG. 3 show a different perspective view of a driving structure of the shading blades of the light shading device 1000 in FIG. 1, with some structures omitted. The guide point 220 is a post with two expanded ends. Such post is penetrated through the shading blade 200, the first connecting rod 310 and the guide rod 510. The two expanded ends of the post can prevent them from detaching.

FIG. 4 shows a curved path C according to an embodiment of the present invention. The chord length L of the curved path C in the arrangement direction A of the corresponding pair of shading blades 200 is more than the diameter of the light passing hole 110. In such way, the curved path C allows the shading blades 200 to move to a first position where the light passing hole 110 is completely shaded, under cooperation of the double-link arm 300, from a second position where the light passing hole 110 is completely unshaded, or vice versa, thereby achieving various light shading effects.

Particularly, in the present embodiment, the chord length L of the curved path C in the arrangement direction A of the corresponding pair of the shading blades 200 is 1.2 times the diameter of the light passing hole 110.

According to a preferable embodiment of the present invention, the radius R of the curved path C is more than half of the largest distance between the proximal and distal ends of the double-link arm 300. This can ensure that the chord height H of the curved path C with same chord length L is not too long, which avoids the moving of the guide point 220 occupying too much space.

Particularly, in the present embodiment, the radius R of the curved path C is less than 1.5 times the largest distance between the proximal and distal ends of the double-link arm 300.

According to a preferable embodiment of the present invention, the chord height H of the curved path C in the direction B perpendicular to the arrangement direction A of the corresponding pair of shading blades 200 is less than 1 centimeter. This allows the shading blades 200 to shift in the direction B perpendicular to the arrangement direction A of the pair of the shading blades 200, so as to promptly change the zones of the shading blades 200 intercepting the light beams. Meanwhile, this also avoids interference with other elements due to large moving range of the shading blades 200.

As less chord height H of the curved path C is better to control the shading blades 200, the chord height H of the curved path C in the direction B perpendicular to the arrangement direction A of the corresponding pair of shading blades 200 is particularly less than 0.8 centimeter in the present embodiment, more preferably less than 0.5 centimeter. Meanwhile, to further ensure that the displacement of the shading blades 200 is not too small in the direction perpendicular to the arrangement direction A of the pair of the shading blades 200, the chord height H of the curved path C in the direction B perpendicular to the arrangement direction A of the corresponding pair of shading blades 200 is preferably more than 0.2 centimeter.

According to a preferable embodiment of the present invention, the length of the second connecting rod 320 is more than half of the diameter of the light passing hole 110 and less than the diameter of the light passing hole 110. With such configuration, the shading blades 200 can move to the first position where the light passing hole 110 is completely shaded, under cooperation of the other double-link arm 300, from the second position where the light passing hole 110 is completely unshaded, during the pivoted point of the first connecting rod 310 relative to the second connecting rod 320 rotating to the position closest to the light passing hole 110 from the position farthest away from the light passing hole 110, thereby achieving various light shading effects, while occupying less space due to the second connecting rod 320 being not too long.

More advantageously, the length of the second connecting rod 320 is more than half of the diameter of the light passing hole 110 and less than ⅔ of the diameter of the light passing hole 110.

According to a preferable embodiment of the present invention, when the guide point 220 lies in the middle M of the curved path C during moving along the curved path C, the corresponding shading blade 200 is deviated farthest away from the light passing hole 110 in the direction B perpendicular to the arrangement direction A of the pair of shading blades 200. This can achieve that the shading blades 200 reciprocally move in the direction B perpendicular to the arrangement direction A of the pair of shading blades 200, during the guide point 220 moving from one end of the curved path C to the other end thereof, which continuously changes the zones of the shading blades 200 intercepting the light beams, while without occupying too much moving space.

Referring back to FIG. 1, the first connecting rod 310 has a curved avoidance portion 311 to avoid the driving shaft 410 of the driving element 400. The curved design of the first connecting rod 310 increase moving range thereof, thus in turn increasing moving range of the corresponding shading blade 200.

Particularly, the curved avoidance portion 311 in the present embodiment is substantially in form of V shape, with the end of the first connecting rod 310 closing to the corresponding shading blade 200 at the curved avoidance portion 311 continuing to extend towards the shading blade 200.

According to a preferable embodiment of the present invention, the distance between the connecting points 230 of the corresponding first connecting rod 310 respectively pivoted to two ends of the side away from each other of each pair of shading blades is more than or equal to $\sqrt{2}$ times the diameter of the light passing hole 110 and less than or equal to 2 time the diameter of the light passing hole 110. This allows the corresponding shading blade 200 to shade the light passing hole 110 in a direction with an angle from 30 degrees (corresponding to the case that the distance between the ends of each shading blade 200 and the connecting point 230 is less than or equal to 2 time the diameter of the light passing hole 110) to 45 degrees (corresponding to the case that the distance between the ends of each shading blade 200 and the connecting point 230 is more than or equal to $\sqrt{2}$ times the diameter of the light passing hole 110) relative to the arrangement direction A of the corresponding pair of the shading blades 200.

As FIG. 1 shown, the light shading device 1000 further includes a separator plate 600 to limit motion of the shading blades 200 in the direction perpendicular to the plane where the shading blades 200 arranged. The separator plate 600 is provided with a hollow portion 610 for the light beams passing therethrough. The lateral side of the corresponding shading blade 200 adjacent to the shading edge 210 thereof is always located outside the hollow portion 610. With such configuration, it is not prone to jamming between the shading blades 200 and the hollow portion 610 and the lateral side of the shading blades 200 adjacent to the shading edge 210 thereof will not enter the hollow portion 610 to finally be imaged and thus avoiding influence on light effects.

Preferably, the separator plate 600 is provided between any two adjacent shading blades 200 in the direction perpendicular to the plane where the shading blades 200 locate, which can avoid mutual interference of the two adjacent shading blades 200.

According to a preferable embodiment of the present invention, the maximum forward and inverse rotational angle of the second connecting rod 320 is merely restricted by one limiting post 321. The second connecting rod 320 is configured to rotate forwardly and inversely so that the shading blades 200 can be smoothly and promptly switched in/out within the limited angle. Reduction of the number of the limiting post 321 can simplify design and lower manufacture costs.

The limiting post 321 is preferably arranged at the side of the driving shaft 410 of the driving element 400 away from the light passing hole 110.

Figure 5:
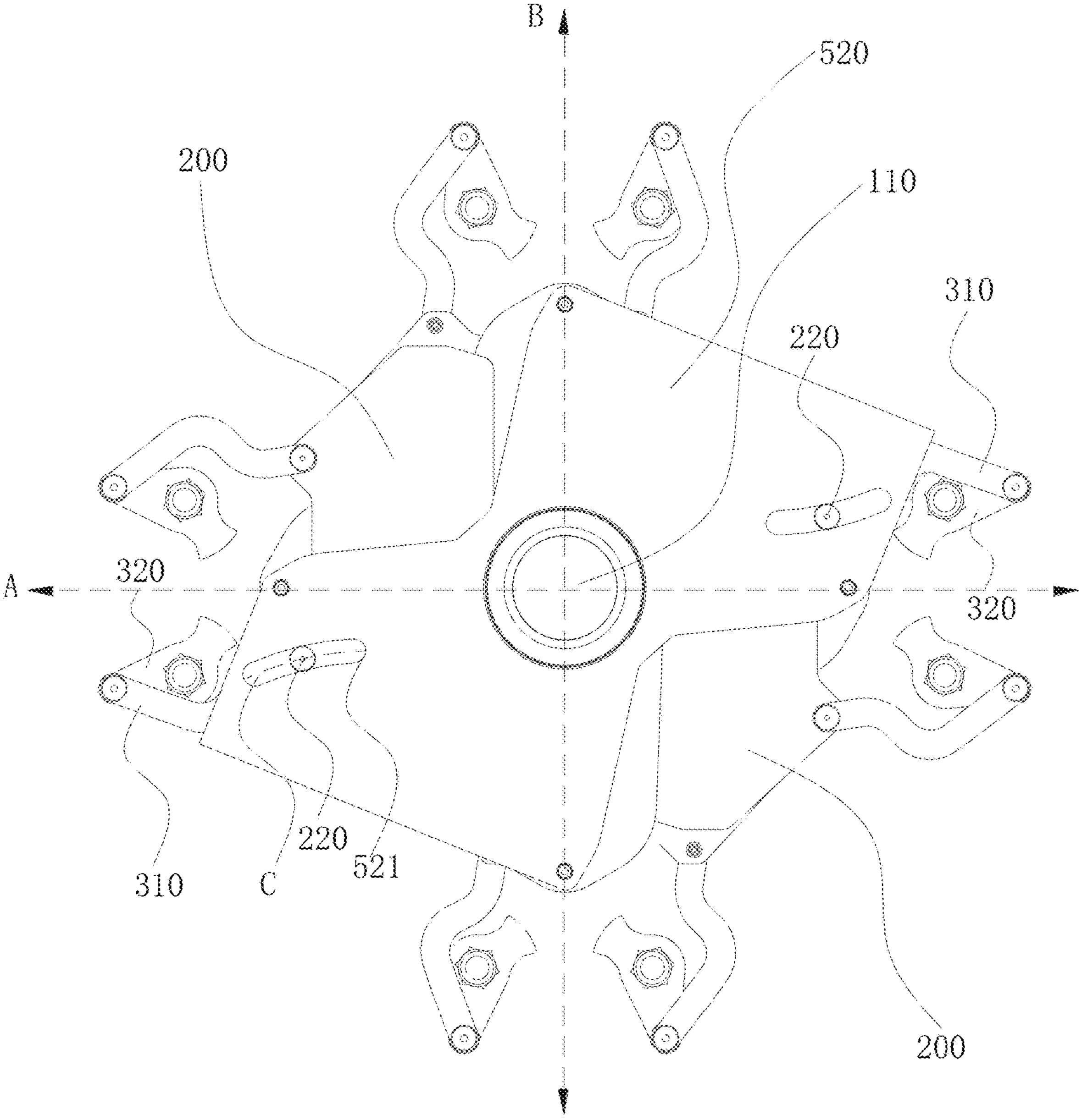
FIG. 5 is a perspective view of a driving structure of shading blades of the light shading device according to another embodiment of the present invention.

Referring to FIG. 5, in other embodiments, the guide element may be in form of a guide plate 520 with a curved guide slot 521, along which the guide point 220 is movable. This can simplify structure of the guide element and the curved path C can be more varied.

The guide point 220 in this embodiment is clamped in the guide slot 521 and slidable along the length direction of the guide slot 521.

The guide plate 520 may be the round plate 100, or the separator plate 600, also an independent plate.

In the embodiment of FIG. 1 shown, two pairs of shading blades 200 having perpendicular arrangement direction A are provided. The light beams through the light shading device 1000 can be shaded by four shading blades 200, thus obtaining light spots in different shapes generated by the light beams.

The guide points 220 for two adjacent shading blades 200 are arranged at the side of the shading blades 200 close to each other or away from each other. Such design ensures adequate space to freely mount the other elements.

Referring back to FIG. 3, the driving shaft 410 of the driving element 400 is provided with a detachable shaft sleeve 420, to which the second connecting rod 320 is pivoted. The height of the double-link arm 300 and thus the shading blades 200 can be adjusted by replacing the shaft sleeve 420 in different heights, which facilitates standardization of the elements.

In this embodiment, the height of the mounting hole on the driving shaft 410 of the driving element 400 is stationary, and the shaft sleeve 420 is fastened by a screw passing the shaft sleeve 420 and inserting the mounting hole.

Figure 6:
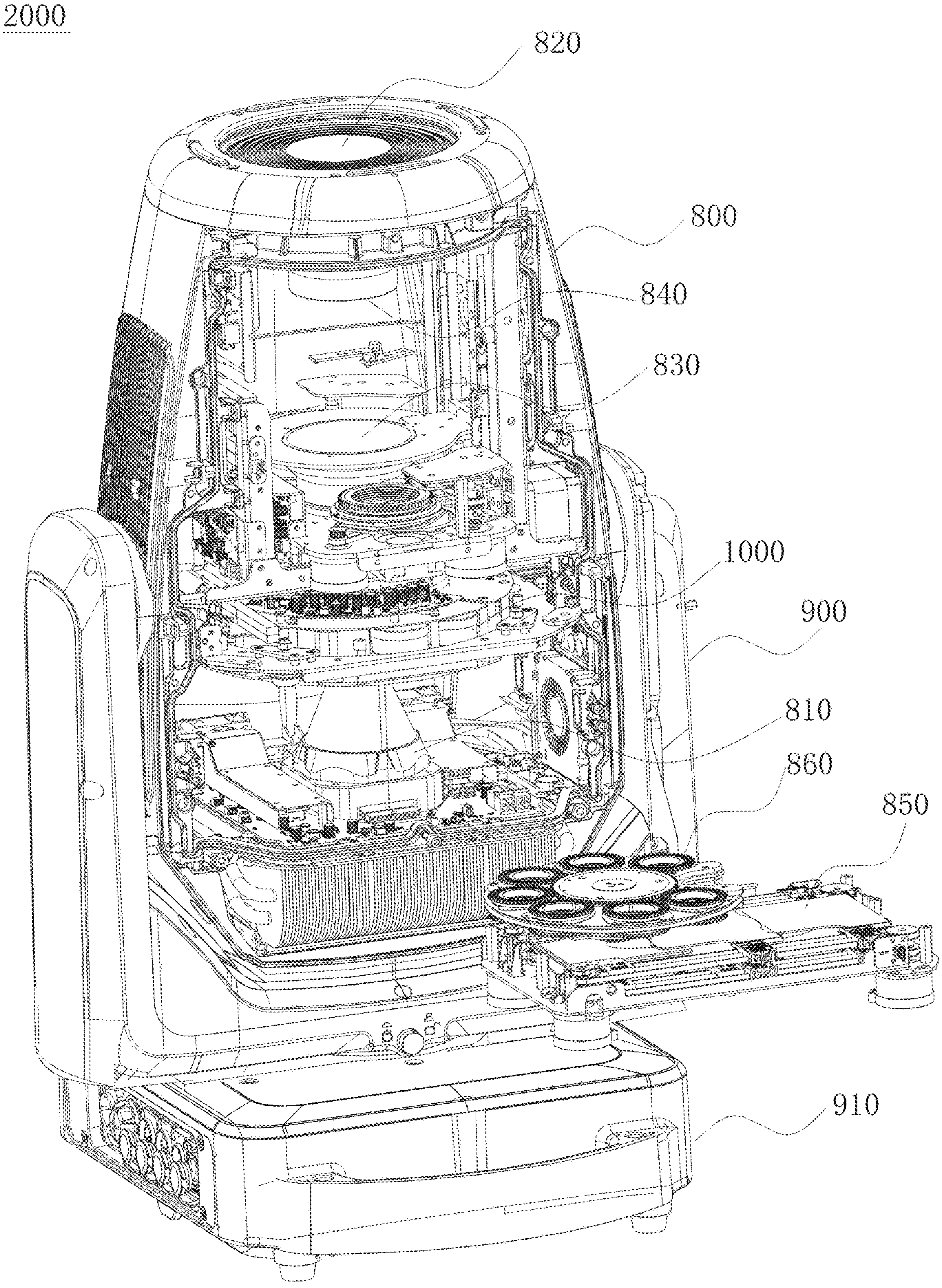
FIG. 6 is a perspective view of a stage light fixture according to an embodiment of the present invention.

FIG. 6 depicts a stage light fixture 2000 having a light head 800 with a light source 810 and the light shading device 1000 in any embodiment mentioned above provided therein. The light beams generated by the light source 810 pass through the light passing hole 110 of the light shading device 1000 and are finally projected from the light outlet 820. The light shading device 1000 inside the light head shapes the light beams generated by the light source 810 in different shape by intercepting or blocking at least portion of the light beams, thereby projecting light spots with abundant light effects.

The light head 800 is further provided with an effect generating assembly for generating light effects to rich light effects of the light spots projected, a focusing assembly 830 for adjusting the focus of the light beams and thus regulate the clarity of the light spots projected, and/or a magnifying assembly 840 for adjusting the divergence angle of the light beams and thus regulate the size of the light spots projected. The effect generating assembly may be a CMY assembly 850 or gobo assembly 860.

The stage light fixture 2000 further includes a support arm 900 for supporting the light head 800 to rotate and a base 910 for supporting the support arm 900 to rotate. With the rotation of the light head 800 and the support arm 900, the light beams from the light head 800 can be projected at any angle.

Obviously, the above-mentioned embodiments of the present invention are only examples for clearly illustrating the present invention, rather than limiting the mode of implementation of the present invention. For those of ordinary skill in the art, changes or alterations in other different forms can also be made on the basis of the above description. It is not needed and also not possible to list all the modes of implementation here. Any modification, equivalent replacement, improvement, etc. made within the spirit and principle of the present invention shall be included within the protection scope of the claims of the present invention.

What is claimed is:

1. A light shading device (1000) having curved guidance, comprising:

a light passing hole (110) for light beams passing therethrough;

at least one pair of shading blades (200) arranged opposite one another, which is configured to intercept at least a portion of the light beams to shape the light beams, wherein each pair of shading blades (200) respectively have a shading edge (210) for shading light beams at a side close to each other, and two ends of the side away from each other are respectively connected with a double-link arm (300), wherein the double-link arm (300) includes a first connecting rod (310) and a second connecting rod (320), one end of the first connecting rod (310) is pivoted to one end of the second connecting rod (320), the other end of the first connecting rod (310) is connected to the corresponding shading blade (200), and the other end of the second connecting rod (320) is connected to a driving element (400) and driven to rotate by the driving element (400);

a guide element, which is configured to limit a guide point (220) on each shading blade (200) to move along a curved path (C) on a plane where the corresponding shading blade (200) is located; and a rotatable base plate (700) for driving all the shading blades (200) to rotate integrally, wherein the driving element (400) is fastened to the rotatable base plate (700).

2. The light shading device according to claim 1, wherein the curved path (C) is in form of a circular arc.

3. The light shading device according to claim 2, wherein a center (O) of the curved path (C) and a center (P0) of the light passing hole (110) are respectively arranged two sides of the curved path (C).

4. The light shading device according to claim 2, wherein the guide element is in form of a guide rod (510) with one end thereof connected to the guide point (220) and the other end thereof fixedly pivoted.

5. The light shading device according to claim 4, wherein a length of the second connecting rod (320) is less than a distant between the driving shaft (410) of the driving element (400) and the center (O) of the curved path (C).

6. The light shading device according to claim 1, wherein the guide point (220) is a connecting point of the shading bade (200) with the first connecting rod (310) of the corresponding shading blade (200).

7. The light shading device according to claim 2, wherein a chord length (L) of the curved path (C) in an arrangement direction (A) of the corresponding pair of shading blades (200) is more than a diameter of the light passing hole (110).

8. The light shading device according to claim 2, wherein a radius (R) of the curved path (C) is more than half of the largest distance between proximal and distal ends of the double-link arm (300).

9. The light shading device according to claim 2, wherein a chord height (H) of the curved path (C) in a direction (B) perpendicular to an arrangement direction (A) of the corresponding pair of shading blades (200) is less than 1 centimeter.

10. The light shading device according to claim 1, wherein a length of the second connecting rod (320) is more than half of a diameter of the light passing hole (110) and less than a diameter of the light passing hole (110).

11. The light shading device according to claim 1, wherein when the guide point (220) lies in a middle (M) of the curved path (C) during moving along the curved path (C), the corresponding shading blade 200 is deviated farthest away from the light passing hole (110) in a direction (B) perpendicular to an arrangement direction (A) of the corresponding pair of shading blades (200).

12. The light shading device according to claim 1, wherein the first connecting rod (310) is provided with a curved avoidance portion (311) to avoid a driving shaft (410) of the driving element (400).

13. The light shading device according to claim 1, wherein the distance between the connecting points (230) of the corresponding first connecting rod (310) respectively pivoted to two ends of the side away from each other of each pair of shading blades is more than or equal to $\sqrt{2}$ times a diameter of the light passing hole (110) and less than or equal to 2 time a diameter of the light passing hole (110).

14. The light shading device according to claim 1, further comprising a separator plate (600), which is configured to limit motion of each shading blade (200) in a direction perpendicular to the plane where the corresponding shading blade (200) is located, wherein the separator plate (600) is provided with a hollow portion (610) for the light beams passing therethrough, and a lateral side of the corresponding shading blade (200) adjacent to the shading edge (210) thereof is always located outside the hollow portion (610).

15. The light shading device according to claim 1, wherein one limiting post (321) is provided to restrict the maximum forward and inverse rotational angle of the second connecting rod (320).

16. The light shading device according to claim 1, wherein the guide element is in form of a guide plate (520) with a curved guide slot (521), and the guide point (220) is movable along the curved guide slot (521).

17. The light shading device according to claim 1, wherein two pairs of shading blades (200) with perpendicular arrangement direction (A) are provided.

18. The light shading device according to claim 17, wherein the guide points (220) for two adjacent shading blades (200) are arranged at the side thereof close to each other or away from each other.

19. The light shading device according to claim 1, wherein a driving shaft (410) of the driving element (400) is provided with a detachable shaft sleeve (420), and the second connecting rod (320) is pivoted to the shaft sleeve (420).

20. A stage light fixture (2000), comprising a light head (800) with a light source (810) and the light shading device (1000) according to claim 1 provided therein, wherein the light beams generated by the light source (810) pass through the light passing hole (110) of the light shading device (1000) and are finally projected from the light outlet (820).

* * * * *